May 14, 1957　　　W. J. TELL ET AL　　　2,792,261
ORNAMENTAL WHEEL COVER
Filed Nov. 7, 1952　　　　　　　　　　　　3 Sheets-Sheet 1

INVENTORS
William J. Tell, &
George L. Rothrock
BY
Willits, Helwig & Bailko
ATTORNEYS

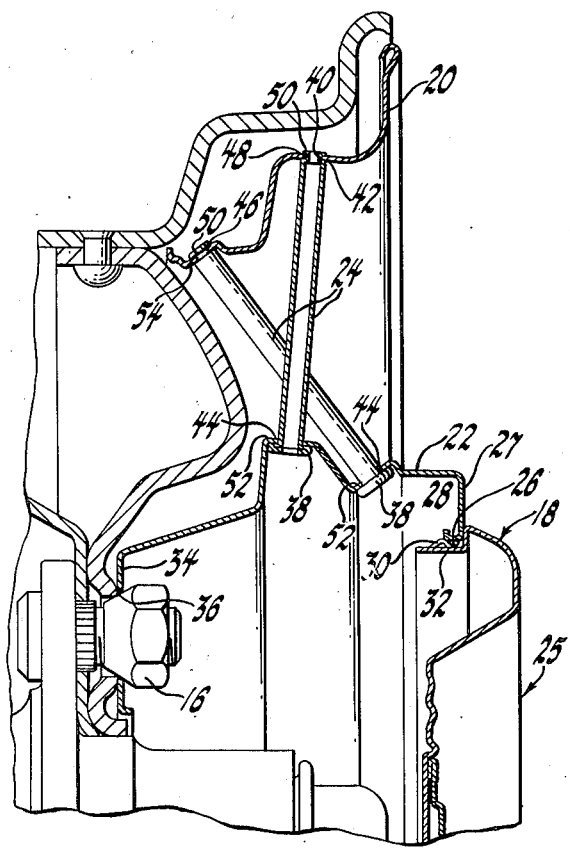

May 14, 1957 W. J. TELL ET AL 2,792,261
ORNAMENTAL WHEEL COVER
Filed Nov. 7, 1952 3 Sheets-Sheet 3

INVENTORS
William J. Tell, &
BY George L. Rothrock
Willito Helwig & Baillio
ATTORNEYS

United States Patent Office 2,792,261
Patented May 14, 1957

2,792,261

ORNAMENTAL WHEEL COVER

William J. Tell, Holly, and George L. Rothrock, Birmingham, Mich., assignors to General Motors Corporation, Detroit, Mich., a corporation of Delaware Application November 7, 1952, Serial No. 319,338

2 Claims. (Cl. 301—37)

This invention relates to vehicle wheel covers and more particularly to detachable ornamental covers having wire spoke construction.

Because of numerous desirable characteristics of the disc wheel, wire wheel construction is no longer practical or economic for mass produced automobiles. Since the potential market for wheels of wire spoke construction is now relatively limited, costs of tooling and production of such wheels is prohibitive. Therefore, a relatively small but select group of consumers, notably in the sports car field, find it necessary to have such wheels constructed at great expense by custom manufacturers. However, even for those willing to bear the cost, certain disadvantages recur which were inherent with load bearing wire wheels, among which is the difficulty encountered in cleaning such wheels. In addition, because of the popularity of bright metal for wheel ornamentation it is desirable that such wheel be chromium plated or fabricated from suitable pre-finished alloy components. However, due to the mode of fabrication and complexity of structure, plating or polishing wire wheels after completion of fabrication is a difficult and expensive procedure.

It is an object of this invention to provide a detachable wheel cover having the three dimensional aspects of a conventional load bearing wire wheel which may be quickly and easily detached from the vehicle wheel for cleaning or other purposes.

Another object is to provide a wheel cover of the type described wherein the mode of construction permits plating or polishing of the component parts prior to assembly thereof.

Still another object is to provide a wheel cover of the type described having novel means of attachment which reduce the likelihood of loss by vibration or removal by unauthorized persons.

A further object is to provide a wheel cover of the type described which is adapted to be secured by a portion of the nuts employed to secure the wheel to the hub, thereby permitting the removal of the wheel cover without removing the wheel.

A still further object of the invention is to provide a wheel cover of the type described having novel structural features permitting the use of rapid assembly techniques.

Other objects, features and advantages of the invention will be readily apparent from the following description of certain preferred embodiments when taken in conjunction with the accompanying drawings wherein:

Figure 2 is a fragmentary sectional view similar to Figure 1 showing the relation of the members in their assembled position.

Figure 2a is an enlarged fragmentary view, partly in section of a portion of the rim and spoke of Figure 2.

Figure 3 is a fragmentary sectional view of a wheel and a wheel cover of a modified construction.

Figure 1:
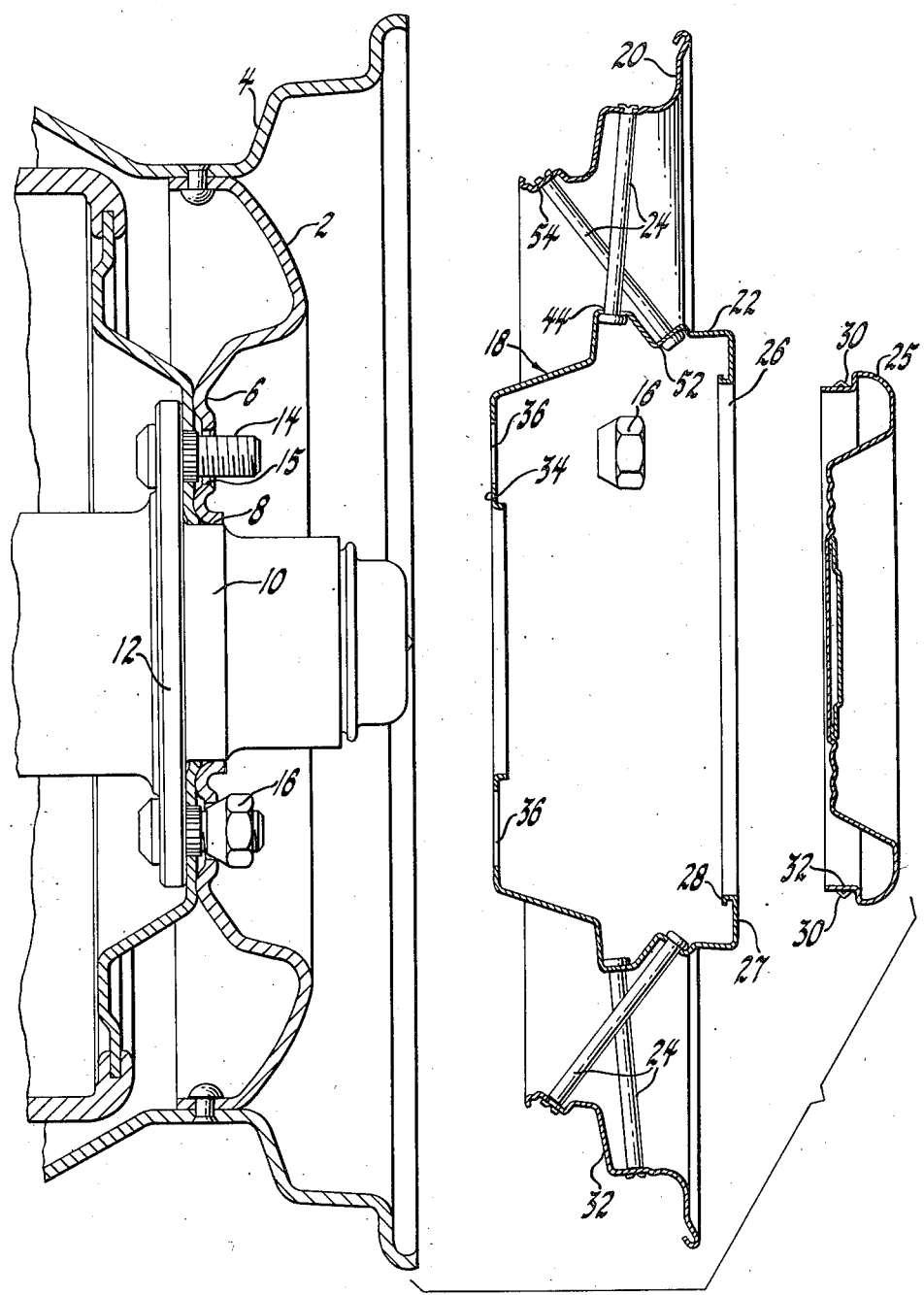
Figure 1 is an exploded sectional view of a vehicle wheel and wheel cover assembly embodying the features of the invention, taken substantially in a plane bisecting the wheel.

Referring now to the drawings and particularly Figure 1 there is illustrated a conventional vehicle wheel comprising an outwardly bowed wheel body 2 having a conventional drop center rim 4 attached to the outer periphery thereof. Wheel body 2 is provided with a central dished portion 6 having a flanged aperture 8 at the center thereof which is adapted to slidingly fit over the hub 10 of the vehicle axle. Radially arranged around a flange 12 secured on hub 10 and rigidly secured therein are a suitable number of wheel bolts 14 which extend outwardly through radially arranged apertures 15 formed in the dished portion 6 of the wheel body 2. Upon tightening wheel nuts 16 on bolts 14 the wheel may be drawn into tight engagement with the flange 12.

Figure 7:
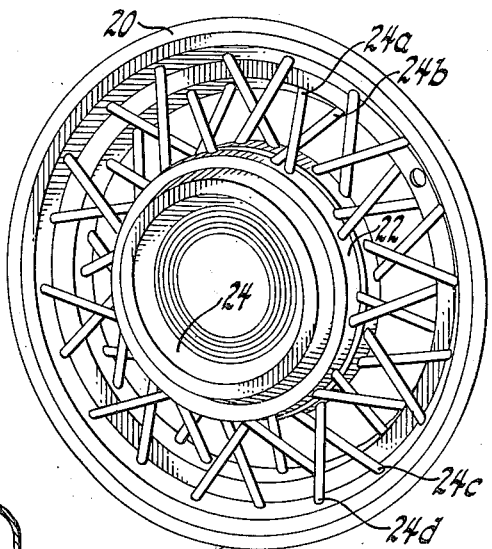
Figure 7 is a perspective view of a wheel cover assembly illustrating the three dimensional appearance thereof.

A wheel cover assembly 18, illustrated in the second stage of the exploded view, comprises an annular outer rim or ring 20 and a generally cup-shaped center hub portion 22 interconnected by a plurality of angularly disposed spokes 24. As illustrated in Figure 7, the spokes are disposed between the rim 20 and hub 22 in two distinct patterns comprising circumferentially spaced sets of spokes 24a and 24b and circumferentially spaced sets of spokes 24c and 24d. Each pair of spokes 24a and 24b is disposed in crossed relation circumferentially of the cover 18 and are mutually inclined axially of said cover to extend between points disposed near the outer end of the hub 22 toward the inner end of the rim 20, while spokes 24c and 24d are also disposed in crossed relation circumferentially of said cover and are mutually inclined axially of the latter to extend between points disposed near the inner end of said hub and toward the outer end of said rim. It will be seen, therefore, that the complete spoke pattern comprises circumferentially arranged alternating crossed sets 24a and 24b and crossed sets 24c and 24d closely adhering to conventional wire wheel structural arrangement, thereby producing a wheel cover simulating a wire wheel. Cover 18 is adapted for nesting relation over the outer face of the vehicle wheel and is retained in position in a manner to be described later herein. After the vehicle wheel and wheel cover assembly have been secured on the wheel hub, a central cap member 25 is pressed into the circular opening 26 formed centrally in the outer side 27 of hub portion 22. The outer side 27 of hub 22 is turned inwardly forming a flange 28 around opening 26. A series of outwardly deformed resilient fingers 30 formed in the reduced annular pilot flange 32 of cap 25 engage the inner edge of flange 28 to yieldably retain the cap 25 in position.

As shown particularly in Figures 1 and 2 the annular base or inner side 34 of hub portion 22 is provided with a plurality of apertures 36 which are adapted to register with the wheel bolts 14 when the cover is placed in position. According to one embodiment of the invention, some of the apertures 36 are of a diameter smaller than the wheel nuts 16 while the remaining apertures 36 are of a diameter sufficiently large to allow the passage thereof over the said wheel nuts. In this way all of the wheel retaining nuts 16 secure the wheel to the bolt-on flange while only a portion of the nuts, preferably a majority, secure both the wheel cover and the wheel to the hub. As applied to a conventional wheel employing five wheel retaining nuts, the cover is removable for cleaning or other purposes by removal of two of the wheel nuts while the remaining three nuts securely retain the wheel to the hub, thereby eliminating the necessity of employing a wheel jack or other device for dismounting the cover. While the wheel cover may be readily dismounted from the wheel with the proper wheel wrench, it will be apparent that loss of the cover as a result of wheel vibration is virtually impossible. In addition, the necessity of employing a wheel wrench for dismounting the cover will undoubtedly considerably reduce loss thereof by theft.

As shown particularly in Fig. 2, in accordance with one embodiment of the invention, the spokes 24 are formed of straight hollow tubing having the inner ends thereof upset to form heads 38 and the outer ends thereof slightly reduced in diameter at 40 to provide a shoulder 42. Each spoke 24 is inserted through one of a plurality of apertures 44 punched in a circumferential pattern around the periphery of hub 22 and extends upward for insertion into one of a plurality of apertures 46 of reduced diameter formed in a circumferential pattern in the annular rim 20. Apertures 46 are of sufficient diameter to permit the entrance of reduced end portions 40, thereby providing a shoulder engaging portion 48 for the shoulder 42 of the spoke. After insertion of the reduced portions 40 into the apertures 46 the outer ends are spun over to form clinching heads 50. Each spoke 24 is successively assembled in the manner described until the spoke pattern is completed. Spokes of the type described may be formed by upsetting or flanging one end of suitable lengths of tubing and rolling or machining the opposite end to a reduced diameter. Since, the upset head serves to axially locate the semi-finished spoke when it is placed in position for rolling or machining, very close length tolerances may be easily maintained. It will be apparent that the provision of a shoulder portion on the spokes permits rapid assembly and assures concentricity of the center hub and rim, since the shoulders on the spokes function to maintain constant spacing.

To compensate for the compound angle of inclination of spokes 24, inclined portions 52 and 54 are formed around the periphery of hub 22 and rim 20, respectively, thereby providing seating faces generally perpendicular to the angle of inclination of the spokes. It will be seen that the inclined portions 52 and 54 eliminate the need for bending each end of the individual spokes, thus considerably reducing the time and cost of production.

In Figure 3 there is illustrated a modification of the invention wherein a generally cup-shaped wheel cover retainer 56 is first secured to the wheel assembly and the wheel cover is thereafter secured to the retainer member by means of a plurality of attaching bolts 58. In this embodiment retainer 56 is provided with an out-turned annular flange 60 at the inner end thereof. A plurality of radially arranged apertures 62 are formed in flange 60 which register with wheel bolts 14. Both the wheel and retainer 56 are placed in position on the bolt-on flange 12 and are simultaneously secured in position when the wheel nuts 16 are drawn up. At its outer end, retainer 56 is provided with a flat, circular ring 64 having spaced apart threaded apertures 66 formed therein to receive the wheel cover attaching bolts 58. In this modification the wheel cover hub portion 22 comprises a shallow annular body of generally U-shaped cross-section having a large circular opening 72 at the inner end thereof and a flanged circular opening 70 at the outer end. Circular opening 72 is adapted to receive a circular cap 74 having a plurality of resilient flange engaging fingers 76 formed on a reduced pilot portion 78 thereof. To secure the hub 22 to the ring 64 of the retainer 56, the said hub portion has secured to the inwardly extending flange 72 thereof by welding or other means, a circular ring 80. Ring 80 has an inwardly extending annular flange 81 formed thereon having a plurality of circumferentially spaced apertures 82 provided thereon adapted to register with the threaded apertures 66 in ring 64. The wheel cover is placed in position on the wheel and the attaching bolts 58 are threaded into apertures 66 to draw flanged ring 80 into tight engagement with ring 64. It will be seen that this modification permits the use of a substantially simplified hub portion while retaining the advantages of relatively easy demountability and freedom from loss due to vibrations. In addition even greater protection from theft is afforded since the bolts employed to secure the cover to the cover retainer may be of a different size or configuration than the wheel retaining nuts. It will be apparent, therefore, that removal by an unauthorized person would be contingent upon possession of the proper wrench.

Figure 4:
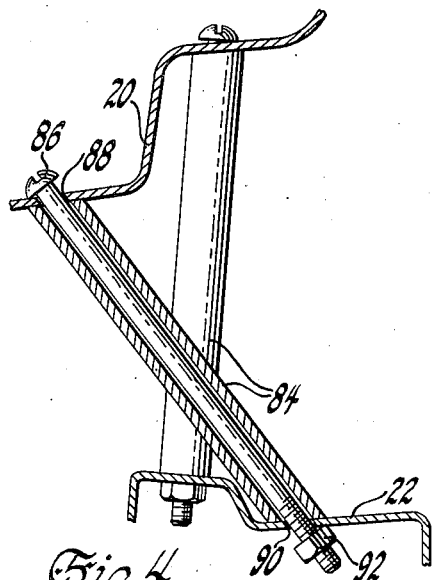
Figure 4 is a fragmentary view partly in section, of another modification.

In Figure 4 there is shown a modification of the spoke construction of the invention wherein tubular spokes 84 extend between the hub portion 22 and the outer rim 20 and are secured in their angular position by long machine bolts 86 which pass through apertures 88 and 90 punched in a circumferential pattern around the rim 20 and hub 22, respectively, and are thereafter retained therein by means of nuts 92.

Figure 5:
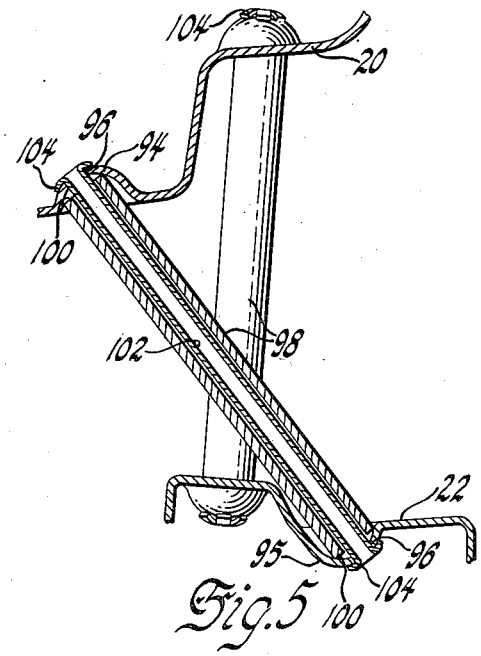
Figure 5 is a fragmentary sectional view of a portion of the wheel cover rim and hub showing a further modification.

In Figure 5 there is shown a further modification of the invention wherein rim 20 and hub portion 22, respectively, are provided with generally circumferentially disposed hemispherical indentations 94 and 95 having apertures 96 formed therein. The hemispherical pockets or indentations 94 compensate for the compound angles formed by the spokes 98. In this embodiment the spokes 98 are of a straight tubular construction wherein the ends 100 are cut off at right angles to the longitudinal axis of the spoke. Spokes 98, extending between the pockets 94 in rim 20 and hub 22, are secured in position by means of a second tubular member 102 which is slidably disposed within spoke 98 and extends outwardly through both apertures 96. After assembly, the outer ends of each tube 102 is spun over to form clinching heads 104 to retain the parts against axial movement.

Figure 6:
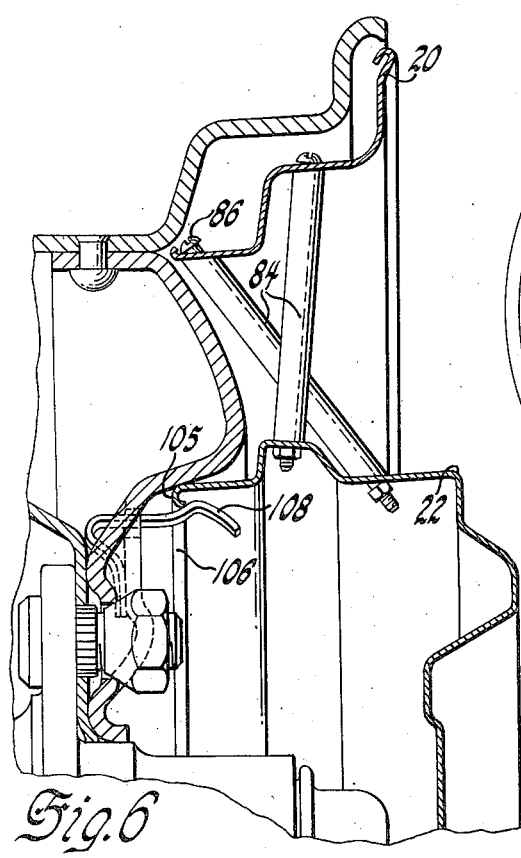
Figure 6 is a fragmentary sectional view similar to Figures 2 and 3 showing a still further modification of the invention utilizing spoke elements having square cut ends.

In Figure 6 there is shown a still further modification of the invention wherein the central hub portion 22 of the wheel cover is provided with an annular flange 105 at the inner end thereof defining a circular opening 106. Flange 105 is adapted to engage a plurality of circumferentially spaced resilient spring clips 108 provided on the central dished portion 6 of the wheel body 2. Since the wheel cover is secured to the wheel by gripping engagement between the flange 105 and resilient clips 108 spaced about the dished portion 6 of the wheel, it is unnecessary to provide an opening in the forward portion of the wheel cover hub 22 and the hub may therefore be formed in one piece.

It will be apparent that there may be further modifications and changes in details of construction without departing from the spirit of the invention, and therefore it is to be understood that it is not intended to limit the scope of the invention to the embodiments herein disclosed but only by the scope of the claims which follow.

We claim:

1. A cover for a vehicle wheel comprising, an annular hub portion, a radially outwardly spaced rim portion, said hub and said rim having circumferentially spaced apertures formed therein, an intermediate annular section comprising circumferentially spaced axially and circumferentially inclined hollow spokes disposed between said hub and said rim in alignment with certain of said apertures, said hub and said rim further being formed with generally hemispherical indentations surrounding said apertures and providing pockets for the ends of said inclined spokes, and an inner tubular member extending through each of said hollow spokes, each of said inner tubular members having their opposite ends headed to retain the cooperating spoke in assembled relation with said rim and hub.

2. A cover for a vehicle wheel comprising an annular hub portion, a radially outwardly spaced rim portion, said hub and said rim being formed with circumferential inclined ridges, said ridges having circumferentially spaced apertures formed therein, and an intermediate annular section comprising circumferentially spaced axially and radially inclined hollow spokes disposed between said circumferential ridges in alignment with certain of said apertures, each of said spokes being provided with an enlarged inner end and a reduced outer end whereby said spoke is insertable through said apertures in said hub and said rim respectively, said reduced ends thereafter being expanded to secure said spokes in position.

References Cited in the file of this patent

UNITED STATES PATENTS

| | | |
|---|---|---|
| 194,272 | Tegnander | Aug. 14, 1877 |
| 1,266,357 | Van Horn | May 14, 1918 |
| 1,433,435 | Van Horn | Oct. 24, 1922 |
| 1,701,843 | Ford | Feb. 12, 1929 |
| 1,703,715 | Booth | Feb. 26, 1929 |
| 1,910,164 | Horn | May 23, 1933 |
| 2,166,216 | Lyon | July 18, 1939 |
| 2,676,850 | McLeod | Apr. 27, 1954 |

FOREIGN PATENTS

| | | |
|---|---|---|
| 263,882 | Great Britain | Apr. 21, 1927 |
| 714,587 | France | Sept. 7, 1931 |